US012695154B2

(12) United States Patent　　(10) Patent No.:　US 12,695,154 B2

Huang　　(45) Date of Patent:　Jul. 28, 2026

(54) BATTERY PACK AND VEHICLE

(71) Applicant: EVE POWER CO., LTD., Hubei (CN)

(72) Inventor: Weicai Huang, Hubei (CN)

(73) Assignee: EVE POWER CO., LTD., Hubei (CN)

( * ) Notice: Subject to any disclaimer, the term of this patent is extended or adjusted under 35 U.S.C. 154(b) by 0 days.

(21) Appl. No.: 18/013,931

(22) PCT Filed: Oct. 27, 2022

(86) PCT No.: PCT/CN2022/127852

§ 371 (c)(1),
(2) Date: Dec. 30, 2022

(87) PCT Pub. No.: WO2024/000958

PCT Pub. Date: Jan. 4, 2024

(65) Prior Publication Data

US 2024/0243426 A1　　Jul. 18, 2024

(30) Foreign Application Priority Data

Jun. 28, 2022　(CN) ......................... 202221649885.4

(51) Int. Cl.
H01M 50/367　　(2021.01)
H01M 50/249　　(2021.01)
(Continued)

(52) U.S. Cl.
CPC ....... H01M 50/367 (2021.01); H01M 50/249 (2021.01); H01M 50/26 (2021.01); H01M 50/262 (2021.01); *H01M 2220/20* (2013.01)

(58) Field of Classification Search
CPC ............. H01M 2220/20; H01M 50/20; H01M 50/209; H01M 50/249; H01M 50/26; H01M 50/262; H01M 50/367; Y02E 60/10
See application file for complete search history.

(56) References Cited

U.S. PATENT DOCUMENTS

2011/0091749　A1　4/2011　Chow
2019/0296293　A1　9/2019　Scharner

FOREIGN PATENT DOCUMENTS

CN　　108039433　A　5/2018
CN　　210429937　U　4/2020
(Continued)

OTHER PUBLICATIONS

International Search Report mailed Mar. 20, 2023; International Application No. PCT/CN2022/127852.
(Continued)

*Primary Examiner* — Holly Rickman
*Assistant Examiner* — Linda N Chau
(74) *Attorney, Agent, or Firm* — McDonald Hopkins LLC

(57)　　　　ABSTRACT

Provided are a battery pack and a vehicle. The battery pack includes at least two layers of battery modules which includes cells and a tray for carrying the cells. The trays of two adjacent layers of battery modules have sides, on which the cells are not arranged, arranged to face each other and connected to each other in a sealed manner. A space between the two trays defines a pressure relief chamber after being sealed. The pressure relief chamber is in communication with a pressure relief opening, the tray is provided with through holes, and one side, on which the cells are arranged, of the tray is in communication with the pressure relief chamber through the through holes. The present application solves the issues of difficult sealing and difficult design of pressure relief channel between multiple layers of battery modules in the related art and improves safety reliability.

14 Claims, 3 Drawing Sheets

(51) Int. Cl.
    *H01M 50/26*     (2021.01)
    *H01M 50/262*     (2021.01)

(56) References Cited

FOREIGN PATENT DOCUMENTS

| | | | |
|---|---|---|---|
| CN | 212148443 | U | 12/2020 |
| CN | 212907891 | U | 4/2021 |
| CN | 113659268 | A | 11/2021 |
| CN | 114552115 | A | 5/2022 |
| JP | 2015216070 | A | 12/2015 |
| WO | 2017004078 | A1 | 1/2017 |
| WO | 2022064855 | A1 | 3/2022 |

OTHER PUBLICATIONS

Extended European Search Report for Application 22823303, PCT/CN2022/127852, dated Oct. 27, 2022, 8 pgs., European Patent Office, Germany.

BATTERY PACK AND VEHICLE

CROSS-REFERENCE TO RELATED APPLICATIONS

This application is a U.S. National Stage Application filed under 35 U.S.C. 371 of International Patent Application No. PCT/CN2022/127852 filed on Oct. 27, 2022 which claims priority of Chinese Patent Application No. 202221649885.4, filed with the Chinese Intellectual Property Administration on Jun. 28, 2022, the disclosures of which are incorporated herein by reference in their entireties.

TECHNICAL FIELD

The present application relates to the field of battery technology, for example, to a battery pack and a vehicle.

BACKGROUND

When the battery pack includes multiple layers of battery modules, there is no specialized exhaust and pressure relief channel between two adjacent layers of battery modules in the associated battery pack structure due to sealing difficulties, thus, when at least one of the cells in the battery module is thermally out of control, the cell instantaneously releases a large amount of gas accompanied by a flame from its inside, and since there is no directional exhaust channel to guide away the gas and flame, the gas and flame may randomly spread around inside the battery pack, the diffusion direction is uncertain, and other components are susceptible to be ignited. Moreover, the battery pack may be bulged due to the rapid increase of the gas pressure therein, and this may even cause the case cover of the battery pack to burst.

SUMMARY

A battery pack and a vehicle are provided according to the present application, which can solve the issues of difficult design of pressure relief channels and difficult sealing between multiple layers of battery modules in the related art and improve safety reliability.

In a first aspect, a battery pack is provided according to an embodiment of the present application, which includes at least two layers of battery modules, specifically, each of the battery modules includes cells and a tray for carrying the cells. The trays of two adjacent layers of the battery modules have sides, on which the cells are not arranged, arranged to face each other and connected to each other in a sealed manner. A space between the two trays defines a pressure relief chamber after being sealed. The pressure relief chamber is in communication with a pressure relief opening, the tray is provided with through holes, and one side, on which the cells are arranged, of the tray is in communication with the pressure relief chamber through the through holes.

In an embodiment, two adjacent layers of the battery modules are arranged in a first direction, the battery pack further includes a partition arranged within the pressure relief chamber, and the partition partitions the pressure relief chamber into a first chamber and a second chamber arranged in the first direction.

In an embodiment, the tray includes a body and a boss protruding from an outer periphery of the body, the cells are carried in the body, the through holes are arranged in the body, the body is provided with a recess on one side, facing away from the cells, of the body, the boss is provided with an avoidance groove on one side, facing away from the cells, of the boss, the recess is in communication with the avoidance groove, a groove bottom of the avoidance groove is provided with the pressure relief opening, and the recesses of the two trays define, together with the partition, the first chamber and the second chamber, respectively.

In an embodiment, a recess bottom of the recess is provided with a post, and the partition is supported on the post.

In an embodiment, a sealing member is arranged between the two trays, and the sealing member is arranged surrounding the recess.

In an embodiment, two adjacent layers of the battery modules are arranged in a vertical direction, the first chamber is in communication with the second chamber, and the pressure relief opening is arranged in the tray of the battery module located in a lower layer.

In an embodiment, the tray is provided with a receiving region for receiving the cells, the through holes are arranged in the receiving region, and the area of the partition is larger than the area of the receiving region, to allow the partition to be spaced between the through holes of the two trays.

In an embodiment, the through hole is arranged to rightly face the cell on the tray.

In an embodiment, two of the trays are detachably connected to each other through a fastener.

In a second aspect, a vehicle is further provided according to an embodiment of the present application, which includes the battery pack described above.

The present application has the following beneficial effects.

According to the battery pack and the vehicle provided in the present application, the trays of the two adjacent layers of battery modules are connected in a sealed manner, thereby ensuring the sealing performance between the two layers of battery modules. When at least one of the cells inside the battery module releases a large amount of gas accompanied by flame, the gas and the flame can be discharged sequentially through the through hole, the pressure relief chamber, and the pressure relief opening, thereby preventing the gas and the flame from spreading inside the battery module, avoiding ignition of other parts, and improving safety: moreover, it is possible to prevent the bulging caused by the rapid increase of the gas pressure inside the battery pack, thereby avoiding bulging of the case cover, improving the safety reliability, and further improving the safety of the vehicle. The pressure relief chamber is formed by using the trays of the battery modules, and the through holes in the trays are used to enable the pressure relief chamber to be in communication with the side, on which the cells are arranged, of the tray, and the pressure relief opening is used to enable the pressure relief chamber to be in communication with outside, thus, the structures in the related art are fully utilized, and are simplified, to allow the overall structure to be more compact, and the layout of the vehicle structure is facilitated.

Figure 1:
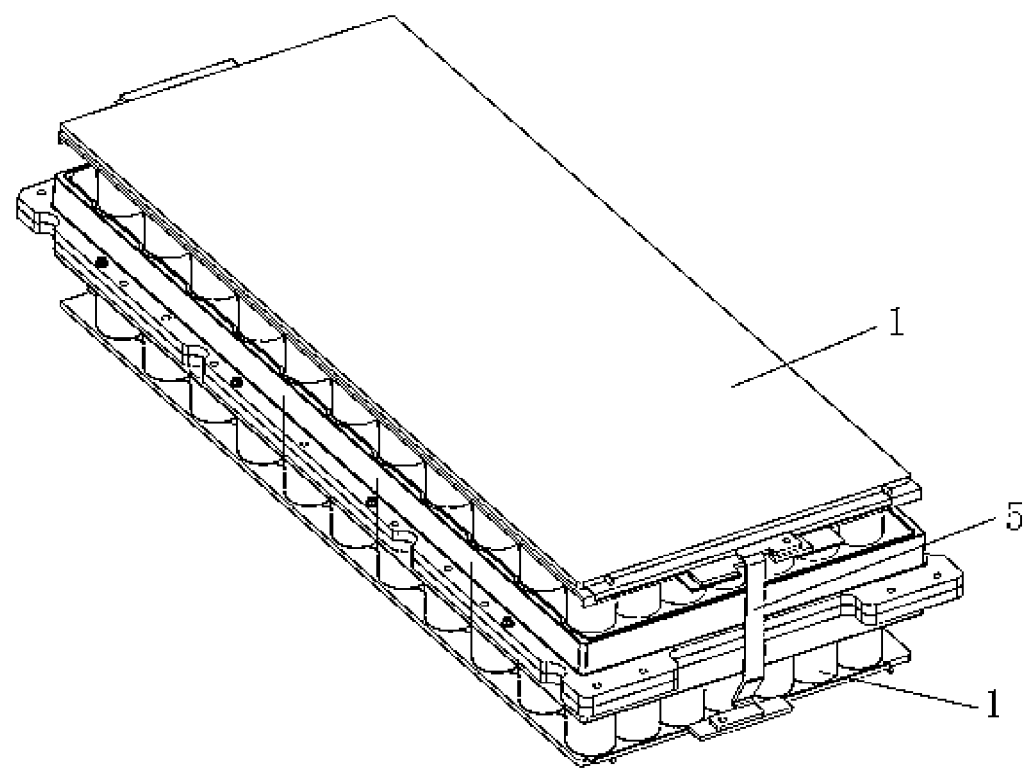
FIG. 1 is a schematic structural diagram of a battery pack according to an embodiment of the present application.

REFERENCE NUMERALS IN THE DRAWINGS 1. battery module;
11. cell;
12. tray;
121. body;
1211. through hole;
122. boss;
1221. pressure relief opening;
123. post;
12A. recess;
12B. avoidance groove;
2. partition;
3. sealing ring;
4. fastener;
5. copper bar; and
6. screw.

DETAILED DESCRIPTION

In the description of the present application, unless otherwise expressly specified and limited, the terms "connected to each other", "connected", "fixing" are to be construed in a broad sense, for example, as permanently connected or detachably connected or integrally connected; mechanically connected or electrically connected; directly connected to each other or indirectly connected to each other via an intermediary: or internally connection of two components or interaction relationship between two components. For those of ordinary skill in the art, specific meanings of the preceding terms in the present application may be construed based on specific situations.

In the present application, unless otherwise expressly specified and limited, when a first feature is described as "above" or "below" a second feature, the first feature and the second feature may be in direct contact, or be in contact via another feature between the two features. Moreover, when the first feature is described as "on", "above" or "over" the second feature, the first feature is right on, above or over the second feature or the first feature is obliquely on, above or over the second feature, or the first feature is simply at a higher level than the second feature. When the first feature is described as "under", "below" or "underneath" the second feature, the first feature is right under, below or underneath the second feature or the first feature is obliquely under, below or underneath the second feature, or the first feature is simply at a lower level than the second feature.

Figure 2:
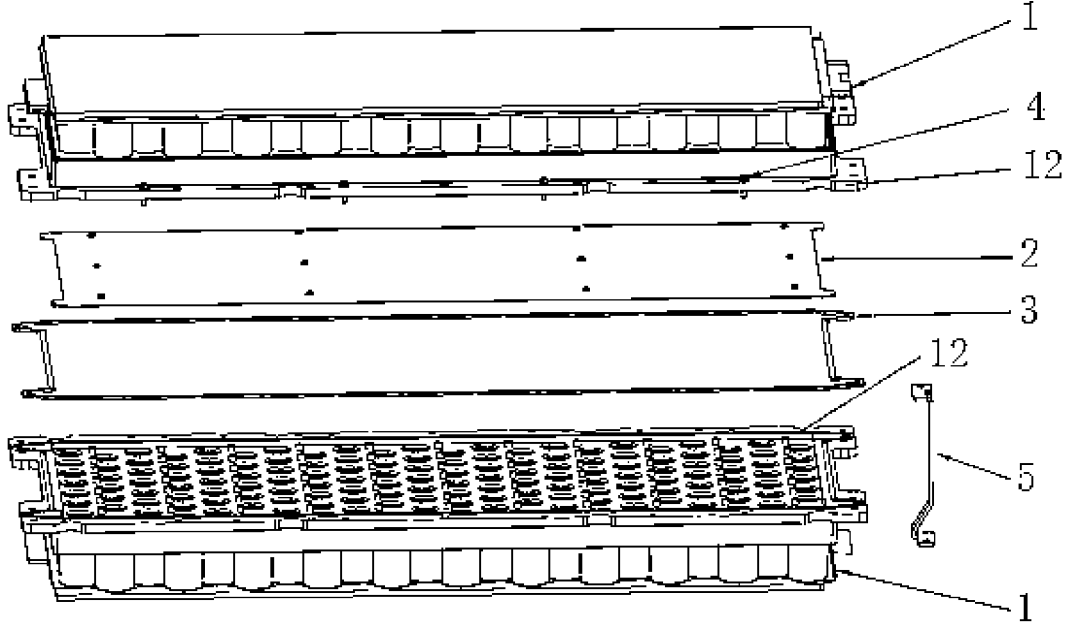
FIG. 2 is an exploded view of a battery pack according to an embodiment of the present application.

A battery pack is provided according to an embodiment of the present application, as shown in FIG. 1 and FIG. 2, the battery pack includes at least two layers of battery modules 1, and each of the battery modules 1 includes cells 11 and a tray 12 for carrying the cells 11. The trays 12 of two adjacent layers of the battery modules 1 have sides, on which the cells 11 are not arranged, arranged to face each other and connected to each other in a sealed manner. A space between the two trays 12 defines a pressure relief chamber after being sealed. The pressure relief chamber is in communication with a pressure relief opening 1221, the tray 12 is provided with through holes 1211, and one side, on which the cells 11 are arranged, of the tray 12 is in communication with the pressure relief chamber through the through holes 1211.

In this embodiment, two layers of battery modules 1 are taken as an example for description, and multiple layers of battery modules 1 may be provided in other embodiments. Illustratively, the trays 12 of the two layers of battery module 1 are connected in a sealed manner, which ensures a sealing performance between the two layers of battery modules 1. When at least one cell 11 inside the battery module 1 releases a large amount of gas accompanied by flame, the through hole 1211, the pressure relief chamber and the pressure relief opening 1221 define a pressure relief channel, and the gas and flame can enter the pressure relief chamber through the through hole 1211 and finally be discharged through the pressure relief opening 1221, thereby preventing the gas and flame from spreading inside the battery module 1, avoiding ignition of other parts, and improving safety. Moreover, it is possible to prevent the bulging of the battery pack caused by the rapid increase of gas pressure inside the battery pack, thereby avoiding the bulging of the case cover and improving the safety reliability. Thus, this embodiment solves the issue of difficulty in designing the pressure relief channel of the double layers of battery modules 1 in the related art. The pressure relief chamber is formed by using the trays 12 of the battery modules 1, and the through holes 1211 in the trays 12 are used to enable the pressure relief chamber to be in communication with the side, on which the cells 11 are arranged, of the tray 12, and the pressure relief opening 1221 is used to enable the pressure relief chamber to be in communication with outside, thus, the structures in the related art are fully utilized, and are simplified, to allow the overall structure to be more compact.

Illustratively, when to manufacture, after the tray 12 of the battery module 1 in the related art is manufactured by a die-casting process or the like, holes and recess such as the through holes 1211 may be machined in the tray 12 in the related art to enable the tray 12 in the related art to be utilized, or the tray according to this embodiment is manufacture according to a new drawing.

Illustratively, when to assemble, components such as a bracket, cells 11, and connecting pieces are installed on the tray 12, and are assembled with reference to the battery module 1 of related art, and then a complete independent battery module 1 is formed. In this embodiment, two layers of battery modules 1 are placed up and down, and the battery modules 1, after being assembled, are overturned by 180 degrees, that is, to allow the tray 12 of the upper layer of battery module 1 to face downward, and the tray 12 of the lower layer of battery module 1 to face upward, and the two trays 12 are connected in a sealed manner. As shown in FIG. 1 and FIG. 2, the two battery modules 1 are finally connected in series by a copper bar 5.

Figure 3:
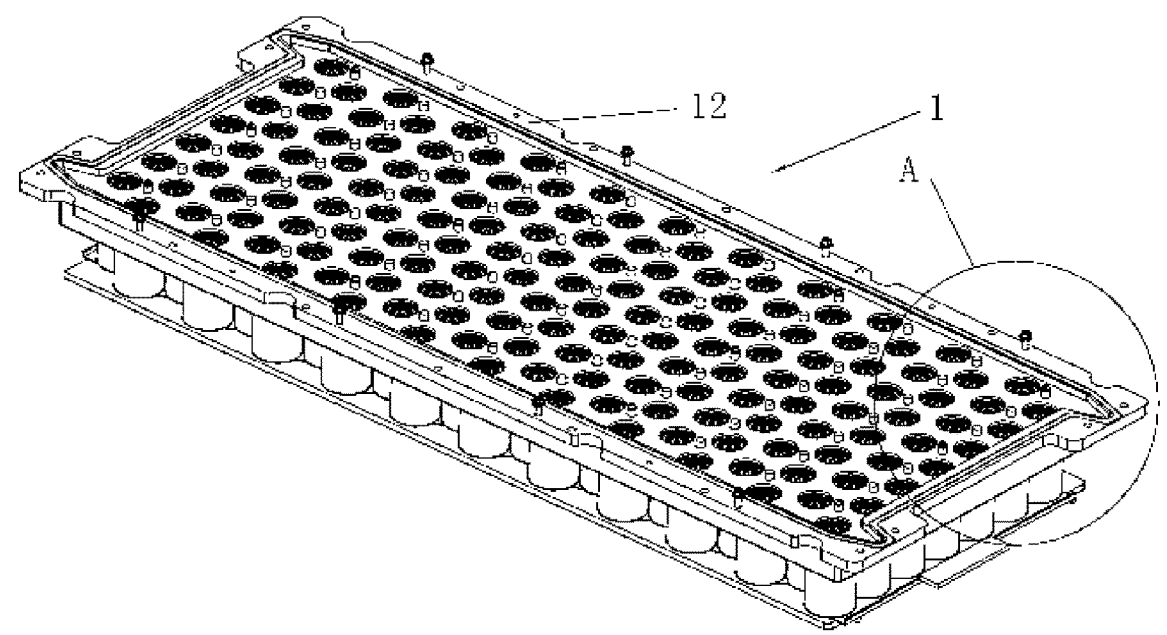
FIG. 3 is a schematic structural diagram of a battery pack with one layer of battery module being removed according to the present application.
Figure 4:
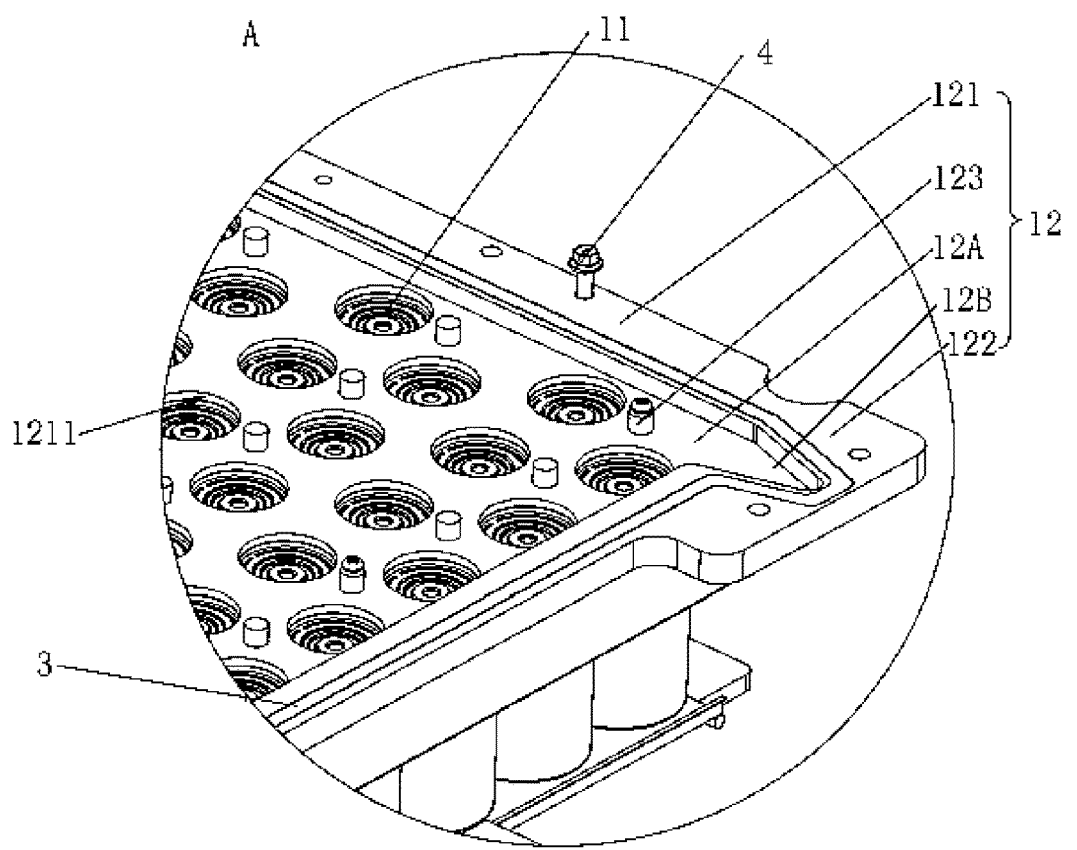
FIG. 4 is an enlarged view of a part A in FIG. 3.

In an embodiment, as shown in FIG. 2 to FIG. 4, two trays 12 are detachably connected to each other by a fastener 4: By way of example, the trays 12 are each provided with a connection hole, and the fastener 4 is a bolt and a nut. The bolt passes through the two connection holes and then is threadedly connected to the nut, so that quick disassembling and assembling can be realized, thereby solving the issues such as difficulty in disassembling and assembling and after-sale maintenance of the double layers of battery modules 1.

Figure 5:
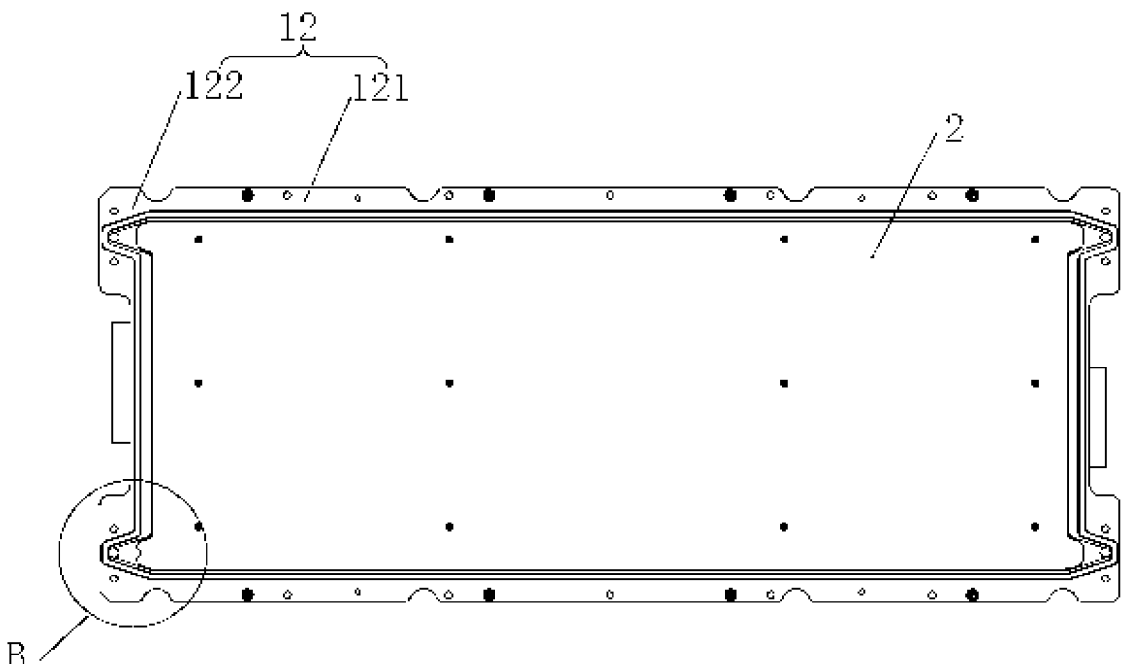
FIG. 5 is a front view of a battery pack with one layer of battery module being removed according to an embodiment of the present application.
Figure 6:
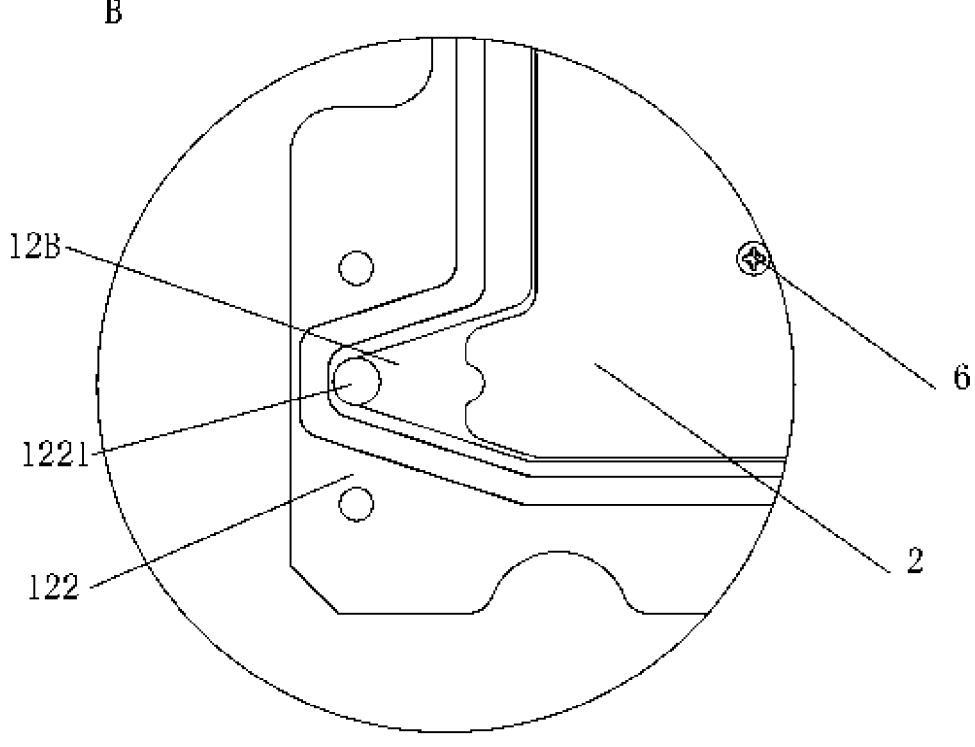
FIG. 6 is an enlarged view of a part B in FIG. 5.

In an embodiment, as shown in FIG. 1, FIG. 5 and FIG. 6, two adjacent layers of battery modules 1 are arranged in a first direction, the battery pack further includes a partition 2 arranged in the pressure relief chamber, and the partition 2 partitions the pressure relief chamber into a first chamber and a second chamber arranged in the first direction. Illustratively, the upper layer battery module 1 has a first pressure relief channel defined by the through holes 1211, the first chamber, and the pressure relief opening 1221 in the tray 12 of this layer of battery module 1, and the lower layer battery module 1 has a second pressure relief channel defined by the through holes 1211, the second chamber, and the pressure relief opening 1221 in the tray 12 of this layer of battery module 1. The pressure relief chamber is partitioned by the partition 2 to avoid direct communication between the two layers of battery modules 1 through the through holes 1211 in the respective trays 12. The partition 2 can block the gas and flame emitted from the cell 11 in one of the layers of battery modules 1, prevent the flame from being sprayed onto the cell 11 of the other layer of battery module 1, and prevent the gas and the flame generated by the single layer of battery module 1 from adversely affecting the other layer of battery module 1 to cause thermally out of control, thereby improving reliability. During assembly, the partition 2 is installed first, and then the upper layer of battery module 1 and the lower layer of battery module 1 are locked by the bolt to be assembled into an integral piece.

In an embodiment, the first direction may be a horizontal direction.

In an embodiment, as shown in FIG. 2 to FIG. 6, the tray 12 includes a body 121 and a boss 122 protruding from an outer periphery of the body 121. The cells 11 are carried on the body 121, and the through holes 1211 are arranged in the body 121. The body 121 is provided with a recess 12A on one side, facing away from the cells 11, of the body 121, the boss 122 is provided with an avoidance groove 12B on one side, facing away from the cells 11, of the boss 122, and the recess 12A is in communication with the avoidance groove 12B. A groove bottom of the avoidance groove 12B is provided with the pressure relief opening 1221, and the recesses 12A of the two trays 12 define, together with the partition 2, the first chamber and the second chamber, respectively. With the recess 12A being provided, the pressure relief chamber with a large space can be formed, the first chamber and the second chamber with the same size and same shape of space can be formed, and the structure has a high uniformity. With the recess 12A, the avoidance groove 12B and the pressure relief opening 1221 provided, the pressure relief chamber and the pressure relief opening 1221 in communication with each other can be formed.

In an embodiment, two adjacent layers of battery modules 1 are arranged in a vertical direction, the first chamber and the second chamber are in communication, and the pressure relief opening 1221 is arranged in the tray 12 of the battery module 1 located in the lower layer. When the gas discharged from the cell 11 causes thermally out of control, the gas is discharged from the lower layer, thereby facilitating structural stability of the two layers of battery modules 1. In other embodiments, the tray 12 of the upper layer of battery module 1 and the tray 12 of the lower layer of battery module 1 may each be provided with a pressure relief opening 1221. Illustratively, the partition 2 may also be sized sufficiently large to disconnect the first chamber and the second chamber, and the chambers are in communication with the outside through the pressure relief openings 1221 in the respective trays 12, which may be configured depending on practical requirements.

In an embodiment, as shown in FIG. 3 to FIG. 6, the body 121 is provided with two bosses 122 on each of two sides thereof, and each of the bosses 122 is provided with a pressure relief opening 1221, that is, multiple pressure relief openings 1221 are formed, so that the pressure relief channel is prevented from being excessively long, thereby improving the reliability of pressure relief.

In an embodiment, as shown in FIG. 4 to FIG. 6, a recess bottom of the recess 12A is provided with a post 123 on which the partition 2 is supported, such that the spacing of the partition 2 from the recess bottom of the recess 12A is achieved so as to form the first chamber and the second chamber by partition. Illustratively, the partition 2 is detachably connected to the post 123 by a screw 6, to facilitate the removing and subsequent maintenance.

In an embodiment, as shown in FIG. 2 to FIG. 4, a sealing member is provided between the two trays 12, and the sealing member is arranged surrounding the recess 12A, to allow the two trays 12 to be connected in a sealed manner so as to form a closed pressure relief chamber. The sealing member is a sealing ring 3, the sealing ring 3 is arranged surrounding the recess 12A, the sealing ring 3 is attached to the tray 12, or the tray 12 is provided with a sealing groove, the sealing ring 3 is installed in the sealing groove, then the two battery modules 1 are assembled up and down, and finally, the two trays 12 are connected, which solves the issue of difficulty in sealing the pressure relief channel of the double layers of battery modules 1.

In an embodiment, as shown in FIG. 5 and FIG. 6, the tray 12 is provided with a receiving region for receiving the cells 11, the through holes 1211 are arranged in the receiving region, the through holes 1211 and the cells 11 are both arranged in the receiving region, to facilitate timely discharging of the gas and the flame generated by any of the cells 11. The area of the partition 2 is larger than the area of the receiving region to allow the partition 2 to be spaced between the through holes 1211 of the two trays 12, thus, the through holes 1211 can be completely blocked, thereby improving reliability.

In an embodiment, as shown in FIG. 3 and FIG. 4, the through hole 1211 is arranged to rightly face the cell 11 in the tray 12, and the gas and flame generated by the cell 11 can be discharged directly from the through hole 1211, so as to prevent other cells 11 in the same layer of battery module 1 from being adversely affected, thereby improving reliability.

A vehicle is further provided according to this embodiment, which includes the battery pack described above. In the battery pack, the trays 12 of the two adjacent layers of battery modules 1 are connected in a sealed manner, thereby ensuring the sealing performance between the two layers of battery modules 1. When at least one of the cells 11 inside the battery module 1 releases a large amount of gas accompanied by flame, the gas and the flame can be discharged sequentially through the through hole 1211, the pressure relief chamber, and the pressure relief opening 1221, thereby preventing the gas and the flame from spreading inside the battery module 1, avoiding ignition of other parts, and improving safety: moreover, it is possible to prevent the bulging caused by the rapid increase of the air pressure inside the battery pack, thereby avoiding bulging of the case cover, improving the safety reliability, and further improving the safety of the vehicle. The pressure relief chamber is formed by using the trays 12 of the battery modules 1, and the through holes 1211 in the trays 12 are used to enable the pressure relief chamber to be in communication with the side, on which the cells 11 are arranged, of the tray 12, and the pressure relief opening 1221 is used to enable the pressure relief chamber to be in communication with outside. Thus, the structures in the related art are fully utilized, and are simplified, to allow the overall structure to be more compact, and the layout of the vehicle structure is facilitated.

What is claimed is:

1. A battery pack, comprising at least two layers of battery modules, wherein each of the battery modules comprises cells and a tray for carrying the cells, the trays of two directly adjacent layers of the battery modules have sides, on which the cells are not arranged, arranged to face each other and connected to each other in a sealed manner, and a space between the two trays defines a pressure relief chamber after being sealed; the pressure relief chamber is in communication with a pressure relief opening, the tray is provided with through holes, and one side, on which the cells are arranged, of the tray is in communication with the pressure relief chamber through the through holes;

wherein two directly adjacent layers of the battery modules are arranged in a first direction, the battery pack further comprises a partition arranged within the pressure relief chamber, and the partition partitions the pressure relief chamber into a first chamber and a second chamber arranged in the first direction;

wherein the tray comprises a body and a boss protruding from an outer periphery of the body, the cells are carried in the body, the through holes are arranged in the body, the body is provided with a recess on one side, facing away from the cells, of the body, the boss is provided with an avoidance groove on one side, facing away from the cells, of the boss, the recess is in communication with the avoidance groove, a groove bottom of the avoidance groove is provided with the pressure relief opening, and the recesses of the two trays define, together with the partition, the first chamber and the second chamber, respectively; and wherein two directly adjacent layers of the battery modules are arranged in a vertical direction, the first chamber is in communication with the second chamber, and the pressure relief opening is arranged in the tray of the battery module located in a lower layer.

2. The battery pack according to claim 1, wherein a recess bottom of the recess is provided with a post, and the partition is supported on the post.

3. The battery pack according to claim 1, wherein a sealing member is arranged between the two trays, and the sealing member is arranged surrounding the recess.

4. The battery pack according to claim 1, wherein the tray is provided with a receiving region for receiving the cells, the through holes are arranged in the receiving region, and an area of the partition is larger than an area of the receiving region, to allow the partition to be spaced between the through holes of the two trays.

5. The battery pack according to claim 1, wherein each of the through holes is arranged to rightly face a respective one of the cells on the tray.

6. The battery pack according to claim 1, wherein two of the trays are detachably connected to each other through a fastener.

7. The battery pack according to claim 1, wherein each of the through holes is arranged to rightly face a respective one of the cells on the tray.

8. The battery pack according to claim 1, wherein two of the trays are detachably connected to each other through a fastener.

9. A vehicle, comprising a battery pack, wherein the battery pack comprises at least two layers of battery modules, wherein each of the battery modules comprises cells and a tray for carrying the cells, the trays of two directly adjacent layers of the battery modules have sides, on which the cells are not arranged, arranged to face each other and connected to each other in a sealed manner, and a space between the two trays defines a pressure relief chamber after being sealed; the pressure relief chamber is in communication with a pressure relief opening, the tray is provided with through holes, and one side, on which the cells are arranged, of the tray is in communication with the pressure relief chamber through the through holes;

wherein two directly adjacent layers of the battery modules are arranged in a first direction, the battery pack further comprises a partition arranged within the pressure relief chamber, and the partition partitions the pressure relief chamber into a first chamber and a second chamber arranged in the first direction;

wherein the tray comprises a body and a boss protruding from an outer periphery of the body, the cells are carried in the body, the through holes are arranged in the body, the body is provided with a recess on one side, facing away from the cells, of the body, the boss is provided with an avoidance groove on one side, facing away from the cells, of the boss, the recess is in communication with the avoidance groove, a groove bottom of the avoidance groove is provided with the pressure relief opening, and the recesses of the two trays define, together with the partition, the first chamber and the second chamber, respectively; and wherein two directly adjacent layers of the battery modules are arranged in a vertical direction, the first chamber is in communication with the second chamber, and the pressure relief opening is arranged in the tray of the battery module located in a lower layer.

10. The vehicle according to claim 9, wherein a recess bottom of the recess is provided with a post, and the partition is supported on the post.

11. The vehicle according to claim 9, wherein a sealing member is arranged between the two trays, and the sealing member is arranged surrounding the recess.

12. The vehicle according to claim 9, wherein the tray is provided with a receiving region for receiving the cells, the through holes are arranged in the receiving region, and an area of the partition is larger than an area of the receiving region, to allow the partition to be spaced between the through holes of the two trays.

13. The vehicle according to claim 9, wherein each of the through holes is arranged to rightly face a respective one of the cells on the tray.

14. The vehicle according to claim 9, wherein two of the trays are detachably connected to each other through a fastener.

* * * * *